United States Patent
Stawiszynski et al.

(10) Patent No.: US 11,935,325 B2
(45) Date of Patent: Mar. 19, 2024

(54) SYSTEM AND METHOD FOR SAVING BANDWIDTH IN PERFORMING FACIAL RECOGNITION

(71) Applicant: MOTOROLA SOLUTIONS, INC., Chicago, IL (US)

(72) Inventors: Maciej Stawiszynski, Cracow (PL); Pawel Jurzak, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 219 days.

(21) Appl. No.: 17/603,137

(22) PCT Filed: Jun. 25, 2019

(86) PCT No.: PCT/PL2019/050036
§ 371 (c)(1),
(2) Date: Oct. 12, 2021

(87) PCT Pub. No.: WO2020/263110
PCT Pub. Date: Dec. 30, 2020

(65) Prior Publication Data
US 2022/0198827 A1    Jun. 23, 2022

(51) Int. Cl.
*G06V 40/16* (2022.01)
*G06F 16/53* (2019.01)
(Continued)

(52) U.S. Cl.
CPC ............ *G06V 40/171* (2022.01); *G06F 16/53* (2019.01); *G06F 16/58* (2019.01); *G06V 10/74* (2022.01); *G06V 10/95* (2022.01); *G06V 40/172* (2022.01)

(58) Field of Classification Search
CPC ...... G06V 40/171; G06V 10/74; G06V 10/95; G06V 40/172; G06V 30/242;
(Continued)

(56) References Cited

U.S. PATENT DOCUMENTS

| 5,781,650 A | 7/1998 | Lobo et al. |
| 6,028,960 A | 2/2000 | Graf et al. |

(Continued)

FOREIGN PATENT DOCUMENTS

| CN | 1687958 A | 10/2005 |
| EP | 0601037 B1 | 5/2000 |
| WO | 2012006579 A1 | 1/2012 |

(Continued)

OTHER PUBLICATIONS

Noor Abdalrazak Shnain et al: "A Feature-Based Structural Measure: An Image Similarity Measure for Face Recognition", Applied Sciences, vol. 7, No. 8, Aug. 3, 2017 (Aug. 3, 2017), p. 786, XP055677987.

(Continued)

*Primary Examiner* — Wesley J Tucker (57) ABSTRACT

Techniques for saving bandwidth in performing facial recognition are provided. An image including a face may be received, over a wireless link, at a first resolution. A facial recognition system may identify a subset of people who may be associated with the face, wherein the facial recognition system cannot definitively associate the face with an individual person in the subset of people, based on the image including the face at the first resolution. A feature of the subset of people that may be used to identify a person within the subset of people may be determined. A request for the portion of the image containing the feature at a second resolution may be sent over the wireless link. The second resolution may be higher than the first.

17 Claims, 6 Drawing Sheets

(51) Int. Cl.
  *G06F 16/58* (2019.01)
  *G06V 10/74* (2022.01)
  *G06V 10/94* (2022.01)

(58) Field of Classification Search
  CPC .... G06V 30/2504; G06V 40/16; G06F 16/53; G06F 16/58
  See application file for complete search history.

(56) References Cited

U.S. PATENT DOCUMENTS

| | | | |
|---|---|---|---|
| 6,600,830 B1 | 7/2003 | Lin et al. | |
| 7,519,197 B2 | 4/2009 | Shan et al. | |
| 8,615,113 B2 | 12/2013 | Lee et al. | |
| 9,087,297 B1 | 7/2015 | Filippova et al. | |
| 9,164,369 B2 | 10/2015 | Menon et al. | |
| 9,253,239 B2 | 2/2016 | Levanon et al. | |
| 9,836,484 B1 * | 12/2017 | Bialynicka-Birula | G06V 40/172 |
| 10,360,478 B2 | 7/2019 | Sabripour et al. | |
| 10,902,267 B2 | 1/2021 | Kucharski et al. | |
| 11,144,749 B1 * | 10/2021 | Lo | G08B 13/19669 |
| 2003/0072467 A1 | 4/2003 | Brundage et al. | |
| 2005/0213796 A1 | 9/2005 | Ikoma et al. | |
| 2006/0239645 A1 * | 10/2006 | Curtner | G08B 13/1968 348/E7.086 |
| 2008/0240571 A1 | 10/2008 | Tian et al. | |
| 2009/0055205 A1 * | 2/2009 | Nguyen | G07F 17/3241 348/169 |
| 2010/0111377 A1 * | 5/2010 | Monroe | G07C 9/38 382/118 |
| 2012/0288140 A1 | 11/2012 | Hauptmann et al. | |
| 2015/0278997 A1 * | 10/2015 | Kim | G06T 5/50 382/195 |
| 2015/0294136 A1 * | 10/2015 | Musial | G06V 40/193 382/118 |
| 2016/0328466 A1 | 11/2016 | Niculescu-Mizil et al. | |
| 2018/0331833 A1 * | 11/2018 | Tomlinson | H04L 63/0861 |
| 2018/0350354 A1 | 12/2018 | Mariaskin et al. | |
| 2023/0177646 A1 * | 6/2023 | Li | G06V 10/80 382/100 |
| 2023/0394875 A1 * | 12/2023 | Lee | G06T 7/174 |

FOREIGN PATENT DOCUMENTS

| | | |
|---|---|---|
| WO | 2015193877 A1 | 12/2015 |
| WO | 2019117735 A1 | 6/2019 |
| WO | 2019132681 A1 | 7/2019 |

OTHER PUBLICATIONS

Smereka Jonathon M et al: "Selecting discriminative regions for periocular verification", 2016 IEEE International Conference On Identity, Security and Behavior Analysis (ISBA), IEEE, Feb. 29, 2016 (Feb. 29, 2016), pp. 1-8, XP032904505.

The International Search Report and the Written Opinion, corresponding patent application No. PCT/PL2019/050036, filed: Jun. 25, 2019, dated Mar. 27, 2020, all pages.

Déforges, Olivier & Ronsin, Joseph. (2000). Region of interest coding for low bit rate image transmission. 1. 107-110 vol. 1. 10.1109/ICME.2000.869556.

Divyansh Dwivedi: "Face Detection For Beginners", Apr. 27, 2018, https://towardsdatascience.com/face-detection-for-beginners-e58e8f21aad9, downloaded from the Internet: Aug. 23, 2021, all pages.

Nam Jun Pyun. Extraction of an image in order to apply face recognition methods. Artificial Intelligence [cs.AI]. Universite Sorbonne Paris Cite, 2015. English. NNT : 2015USPCB132. tel-0157811, all pages.

Rauschenbach, U.. "Progressive Image Transmission Using Levels of Detail and Regions of Interest." (2007).

* cited by examiner

SYSTEM AND METHOD FOR SAVING BANDWIDTH IN PERFORMING FACIAL RECOGNITION

BACKGROUND

The capabilities of image recognition systems, in particular facial recognition systems, are always improving. In many cases, the systems used for facial recognition are based on machine learning, and as such the systems continue to learn and improve the more they are used. These improvements may continue as long as the systems are provided with additional images and are provided feedback on if the conclusion reached is correct or not.

Additionally, datasets of images, especially images of people including their faces are getting larger and larger. For example, it has been reported that in the United States, the Federal Bureau of Investigation may have access to over 650 million photographs of people. These images may be labeled with information such as the person's name, address, contact information, etc. In addition, the images may be labeled with additional physical characteristics (e.g. birth marks, moles, tattoos, etc.) and where those characteristics appear on the person (e.g. tattoo on neck, small mole on upper lip, etc.)

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Although facial recognition systems are improving and the available datasets are always increasing, the technology is not perfect. Typically, a facial recognition system will identify a face as matching a database image once a certain confidence level is reached. For example, a facial recognition system may be configured such that if it can determine that an image of a face matches a database image with 95% confidence, then the system may declare a facial recognition match. Generally, the higher the quality of the input image, the greater the likelihood that the system may be able to declare a facial recognition match with higher confidence.

A problem arises when external factors limit the quality of the input images. For example, in a law enforcement context, an officer in the field may be equipped with a body worn camera (BWC). The BWC itself may be capable of recording images with high resolution. If the officer is connected to a facial recognition system via a high bandwidth broadband connection (e.g. Long Term Evolution (LTE), 5G, WiFi, etc) then the high resolution images may be utilized.

In many cases, law enforcement officers are not coupled to the facial recognition system via high bandwidth connections. For example, most law enforcement officer's primary means of communications is through a Land Mobile Radio (LMR) walkie talkie or other such portable device. Although LMR radios do allow for transmission of data, the bandwidth available is significantly less than a broadband connection. Furthermore, law enforcement officers may be utilizing battery operated devices. Sending higher resolution images over lower bandwidth connections may require longer amounts of time, and result in additional battery usage. The additional battery usage may limit the amount of time a law enforcement officer may remain in the field before having to recharge the battery. Because of these concerns, a lower resolution image may be sent, even though a higher resolution image is available on the image capture device (e.g. BWC). It should be understood that the techniques described herein are applicable any time a lower resolution image is sent, regardless of the reason why a lower resolution image is utilized.

The facial recognition system may be able to utilize the lower resolution images, but may not be able to reach a high enough confidence level to indicate a match with a single individual. The facial recognition system may only be able to narrow potential matches down to a subset of people, with the matches for each of those people being below the designated threshold. For example, given an image, the facial recognition system may be able to determine a match with Person A with a confidence level of 60% and a match with Person B with a confidence level of 70%. As stated above, the system may set a threshold that a facial recognition match is only declared once the confidence level exceeds 95%. Because the threshold has not been exceeded for either Person A or Person B, the system is not able to declare a match with either person.

The techniques described herein overcome this problem and others. The initial image including a face may be sent at a first, lower resolution. The facial recognition system may then identify a subset of people whose images in a database may match the face contained in the low resolution image, although at a confidence level that is not sufficient to indicate a match with any single individual. The facial recognition system may then analyze the images and metadata associated with those images stored in the database to determine a distinguishing feature amongst the identified subset of people. In general, the distinguishing feature may not be visible or detectable in the lower resolution image.

The facial recognition system may then request a portion of the image including the distinguishing feature at a second, higher resolution. As mentioned above, the source of the image (e.g. BWC) may store the image at a higher resolution, but only send a low resolution image due to bandwidth constraints. Sending the image at the second, higher resolution may use a similar amount of bandwidth as the image that was initially sent, because the portion of the image is smaller than the complete image.

For example, an image including a face may be sent to the facial recognition system. The system may determine that the face may either belong to Person A or Person B based on a comparison with high resolution images stored in a database, but cannot declare a match with either person with sufficiently high confidence. In one example, the images stored in the database are associated with metadata. The system may compare the metadata to identify features that distinguish person A from person B. For example, the metadata may indicate that Person A has a tattoo on his neck while person B has no tattoos.

The facial recognition system may then request the portion of the image that contains the person's neck be sent at a second higher resolution. It should be noted that this second higher resolution does not imply that more bandwidth is required. For example, the image as captured by the BWC may be a multiple mega pixel image. This image may be initially sent at the lower resolution of 640×480 pixels (approx. 300,000 pixels total). When the selected portion of the image is selected (e.g. the neck) the image may be sent with the same 640×480 pixel resolution. However, because the image is focused on only a portion of the complete image, the neck portion is effectively sent with a higher resolution than the image initially sent to the facial recognition system Upon receipt of the requested portion of the image, the facial recognition system may determine if a neck tattoo appears in the portion of the image. If so, the person may be identified as Person A. Otherwise, the person may be identified as Person B. It should be further understood that the subset of people may include more than 2 people, and the process may be repeated iteratively until the subset of people includes at most one person.

A method is provided. The method comprises receiving, over a wireless link, an image including a face, at a first resolution. The method includes identifying, with a facial recognition system, a subset of people who may be associated with the face, wherein the facial recognition system cannot definitely associate the face with an individual person in the subset of people, based on the image including the face at the first resolution. The method includes determining a feature of the subset of people that may be used to identify a person within the subset of people. The method includes requesting, over the wireless link, a portion of the image containing the feature at a second resolution, wherein the second resolution is higher than the first resolution.

In one aspect, the method further comprises receiving, over the wireless link, the portion of the image containing the feature at the second resolution. The method further comprises identifying, with the facial recognition system, presence of the feature in the portion of the image. In one aspect, the method comprises removing people from the subset of people that do not include the feature. The method includes repeating the steps of determining the feature, requesting the portion of the image, receiving the portion of the image containing the feature, identifying the presence, and removing people from the subset until the subset contains, at most, one person.

In one aspect the image of the face at the first resolution and the portion of the image containing the feature at the second higher resolution consume similar amounts of bandwidth on the wireless link. In one aspect identifying a feature in the subset of people further comprises comparing meta data associated with images in a database of the facial recognition system to identify the feature in the subset of people, wherein the feature is possessed by less than all of the subset of people.

In one aspect, identifying a feature in the subset of people further comprises comparing images in a database of the facial recognition system to identify the feature in the subset of people, wherein the feature is possessed by less than all of the subset of people. In one aspect, comparing images further comprises utilizing at least one of a structural similarity index measure or a feature based structural measure.

A system is provided. The system includes a processor and a memory coupled to the processor. The memory contains a set of instructions that when executed by the processor cause the processor to receive, over a wireless link, an image including a face, at a first resolution. The instructions further cause the processor to identify a subset of people who may be associated with the face, wherein the processor cannot definitely associate the face with an individual person in the subset of people based on the image including the face at the first resolution. The instructions further cause the processor to determine a feature of the subset of people that may be used to identify a person within the subset of people, the feature included in a portion of the image of the face. The instructions further cause the processor to request, over the wireless link, a portion of the image containing the feature at a second resolution, wherein the second resolution is higher than the first resolution.

In one aspect, the instructions further cause the processor to receive, over the wireless link, the portion of the image containing the feature at the second resolution. The instructions further cause the processor to identify presence of the feature in the portion of the image. In one aspect, the instructions further cause the processor to remove people from the subset of people that do not include the feature. The instructions further cause the processor to repeat the instructions to determine the feature, the request the portion of the image, the receive the portion of the image containing the feature, the identify the presence, and the remove people from the subset until the subset contains, at most, one person.

In one aspect, the image of the face at the first resolution and the portion of the image containing the feature at the second higher resolution consume similar amounts of bandwidth on the wireless link. In one aspect, the instructions to identify a feature in the subset of people further comprises instructions to compare meta data associated with images in a database to identify the feature in the subset of people, wherein the feature is possessed by less than all of the subset of identified people.

In one aspect, the instructions to identify a feature in the subset of people further comprises instructions to compare images in a database to identify the feature in the subset of people, wherein the feature is possessed by less than all of the subset of identified people. In one aspect the comparing images instructions further comprises instructions to utilize at least one of a structural similarity index measure or a feature based structural measure.

A non-transitory processor readable medium containing a set of instructions thereon is provided. The instructions, when executed by a processor cause the processor to receive, over a wireless link, an image including a face, at a first resolution. The instructions further cause the processor to identify a subset of people who may be associated with the face, wherein the processor cannot definitely associate the face with an individual person in the subset of people based on the image including the face at the first resolution. The instructions further cause the processor to determine a feature of the subset of people that may be used to identify a person within the subset of people, the feature included in a portion of the image including the face. The instructions further cause the processor to request, over the wireless link, a portion of the image containing the feature at a second resolution, wherein the second resolution is higher than the first resolution.

In one aspect, the non-transitory processor readable medium further comprises instructions which cause the processor to receive, over the wireless link, the portion of the image containing the feature at the second resolution. The non-transitory processor readable medium further comprises instructions which cause the processor to identify presence of the feature in the portion of the image. In one aspect, the non-transitory processor readable medium further comprises instructions which cause the processor to remove people from the subset of people that do not include the feature. The non-transitory processor readable medium further comprises instructions which cause the processor to repeat the instructions to determine the feature, the request the portion of the image, the receive the portion of the image containing the feature, the identify the presence, and the remove people from the subset until the subset contains, at most, one person.

In one aspect, the instructions to identify a feature in the subset of people further comprises instructions to compare meta data associated with images in a database to identify the feature in the subset of people, wherein the feature is possessed by less than all of the subset of identified people. In one aspect, the instructions to identify a feature in the subset of people further comprises instructions to compare images in a database to identify the feature in the subset of people, wherein the feature is possessed by less than all of the subset of identified people. In one aspect, the comparing images instructions further comprises instructions to utilize at least one of a structural similarity index measure or a feature based structural measure.

Figure 1:
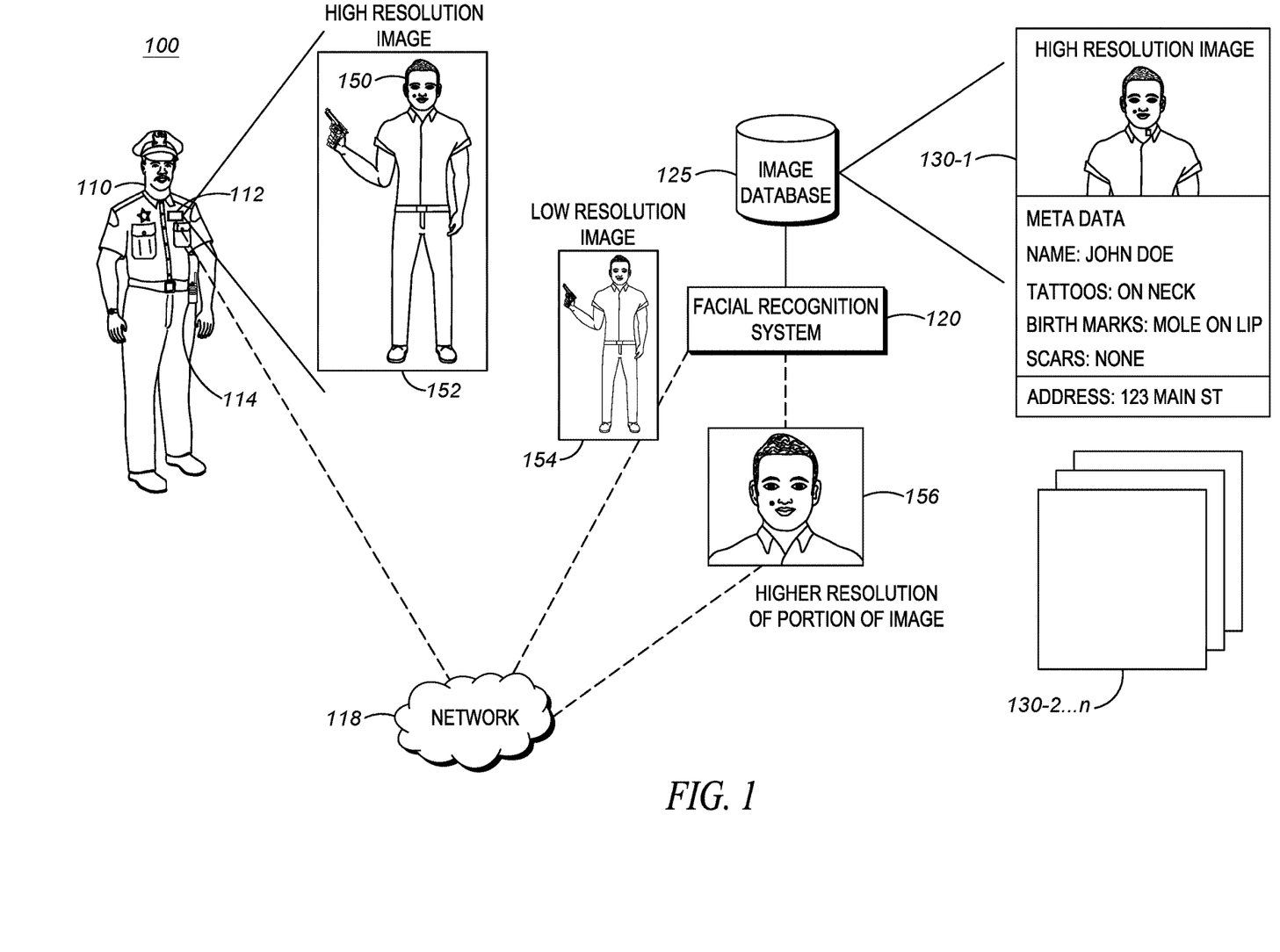
FIG. 1 is an example of an environment where the system and method for saving bandwidth in performing facial recognition may be implemented.

FIG. 1 is an example of an environment where the system and method for saving bandwidth in performing facial recognition may be implemented. Environment 100 may include a person 110 who may be a member of a public safety organization. For example, the person may be a law enforcement officer. The remainder of the description will refer to person 110 as a law enforcement officer (LEO), however it should be understood that this is for ease of description. The techniques described herein are not limited to any particular type of user.

LEO 110 may carry several devices. For example, he may carry a BWC 112. The BWC may allow the LEO to record images/video of his surroundings. For purposes of ease of description, the output of the BWC will be referred to as an image. However, it should be understood that the techniques are equally applicable to video. Those image may be captured at a relatively high resolution. The LEO may also carry a wireless communications device 114, such as LMR walkie talkie. In other cases, the office may carry a wireless communication device such as a broadband (e.g. Long Term Evolution (LTE)) device (not shown). The BWC may be coupled to the wireless communication device via wired or wireless communication. The BWC may utilize the wireless communications device to send images through network 118.

It should be noted that although the BWC and wireless communication device are described as separate devices, this is for purposes of description only. In some implementations, the BWC may include wireless communications capabilities. In addition, it should be understood that although FIG. 1 is being described in terms of wireless communications between wireless communications device 114 and network 118, the techniques described herein are equally applicable to wired communications from the BWC.

Network 118 may receive images from the BWC 112 via the wireless communications device 114. Network 118 may be any suitable wired or wireless network that is capable of receiving images generated by the BWC and sending them to facial recognition system 120. The facial recognition system may be coupled to image database 125 which may store a plurality of records 130-1 . . . n. The records may include data associated with an individual, including a higher resolution image of the individual. The facial recognition system may receive an image from the BWC that includes a face and attempt to match that image with a specific record in the database.

As mentioned above, image database 125 may store a plurality of records 130-1 . . . n. Each of those records 130 may include basic data about an individual, for example data such as the person's name, last known address, birthdate, etc. Each record may also include a relatively high resolution image of the person. Finally, the record may also include other data about the individual, that may be used for visual identification. For example, the information could include locations on the person's body of tattoos, birthmarks, moles, or any other feature that could be identified by visual inspection of the person.

It should be understood that the source of the information for records 130 is unimportant. In many cases, basic information, such as name, address, and image may have been obtained from databases such as driver's license databases. In some cases, when a person is arrested and/or sent to jail/prison, detailed information regarding the person's physical appearance (e.g. tattoos) are recorded. The techniques described herein are not limited to any particular source of records 130.

In operation, LEO 110 may be going about his daily activities and encounter a person 150 who needs to be identified. The person may be a suspect in a crime or a cognitively impaired person who is lost. The techniques described herein are not limited to any particular use case. For purposes of the remainder of the description, the person to be identified will be referred to as the unidentified person.

LEO 110 may capture an image of unidentified person 150 using his BWC 112. The captured image may be a relatively high resolution image 152. The relatively high resolution image 152 may be stored, for example, on the BWC, or some other device associated with the LEO. The LEO may then send a lower resolution 154 version of the relatively high resolution image 152 to the facial recognition system 120 by utilizing his wireless communications device 114 and network 118.

The facial recognition system may receive the lower resolution image 154 and attempt to match the image to one of the records 130 in the database 125 using any readily available facial recognition techniques. The techniques described herein are not limited by the particular facial recognition algorithms that are in use and would be applicable with currently available and newly developed facial recognition techniques.

In some cases, the facial recognition system 120 may not be able to identify a match to a single record 130 in the database, but may indicate that there is a subset of records that match the face contained in the low resolution image 154, although at a level below the confidence threshold to indicate a match. For example, the low resolution image may potentially match two records (e.g. two people) in the database, but the facial recognition system cannot indicate a positive match with either one. Although the description is stated in terms of matching two records, it should be understood the techniques are applicable with any number of potential matches.

As will be explained in further detail with respect to FIG. 2, the facial recognition system may identify a distinguishing feature between the two potentially matched records. For example, the facial recognition system may identify that one record includes a person with a tattoo on their neck, while the person associated with the other record has no tattoos. As another example, one record may include a person with a mole on their lip, while the other record does not include a person with a mole. For the present example, assume that one person has a mole on their face while the other does not.

Because the initial image 154 was sent at a lower resolution, the identified distinguishing feature may not be visible in the initial image. The facial recognition system 120 may then communicate back to the LEO's 110 BWC 112 to send a portion of the image at a higher resolution. The portion of the image may be selected based on the location of the identified distinguishing feature. For example, if the identified distinguishing feature is a mole on the upper lip, the portion of the image that is requested may be the portion including the face. In some implementations, the portion of the image may be specified using pixel coordinates (e.g. send portion defined by rectangle Point A (10, 10) to point B (100,100), where the numbers in parenthesis specify coordinates of the image in pixels). In other implementations, classifiers may be used to recognize parts of the image (e.g. face detection). The classified portion may then be requested (e.g. send portion including the neck). The particular techniques to identify the portion of the image are unimportant.

The BWC 112 may receive the request for the portion of the image at the higher resolution. As mentioned above, the BWC may store the initial high resolution image 152. The BWC may then zoom in to the desired portion of the stored image 152 and return the portion of the image 156 to the facial recognition system 120. For example, in the current example, the portion of the image containing the distinguishing feature is the face. Thus, the image that is returned will be the portion of the image 156 including the face.

As mentioned above, just because the portion of the image is sent at a higher resolution does not imply that more bandwidth is utilized. The same bandwidth may be utilized to send a smaller portion of the original image, thus resulting in the smaller portion of the image being sent in higher resolution than the original transmission. However, in other cases, the portion of the image may be requested in even higher resolution than the initial image, resulting in higher bandwidth requirements. The techniques described herein are applicable in either case.

The facial recognition system 120 may then examine the received portion of the image 156 to determine if the distinguishing feature is present. Based on the presence of the distinguishing feature, the facial recognition system can determine which identified record matches the unidentified person. In an alternate implementation, the facial recognition system may send the BWC the distinguishing feature. The BWC itself may then examine the stored high resolution image to determine if the feature is present. If so, the BWC may respond with a yes/no indication of the presence of the feature, thus further reducing the amount of wireless bandwidth that is used as the portion of the image no longer needs to be sent to the facial recognition system. What should be understood is that once the distinguishing feature has been identified, the device that determines presence of the feature in the image is relatively unimportant.

It should be understood that although the previous example, was described in terms of a subset of people that includes only two records, this was for ease of description only. In some cases, the initially identified subset of people may include more than two people. For example, the initially identified subset of people may include four records. The facial recognition system 120 may identify that half the records include people who have neck tattoos and request the portion of the image including the neck. If the portion of the image returned includes a neck tattoo, those records without a neck tattoo can be eliminated, thus leaving two records remaining. The process can then be repeated to identify a distinguishing feature between the remaining to records. It should be understood that the subset identification/distinguishing feature selection process may be continued iteratively until the subset of people includes only one record (indicating a match) or no records (indicating no match found).

In addition, although reference is made above to high/high resolution and low/lower resolution, it should be understood that those references are relative and are not intended to imply specific absolute resolutions. Instead, a high resolution image is intended to imply a resolution similar to that with which the image was initially captured while low resolution image is a resolution lower than the initial capture.

Figure 2:
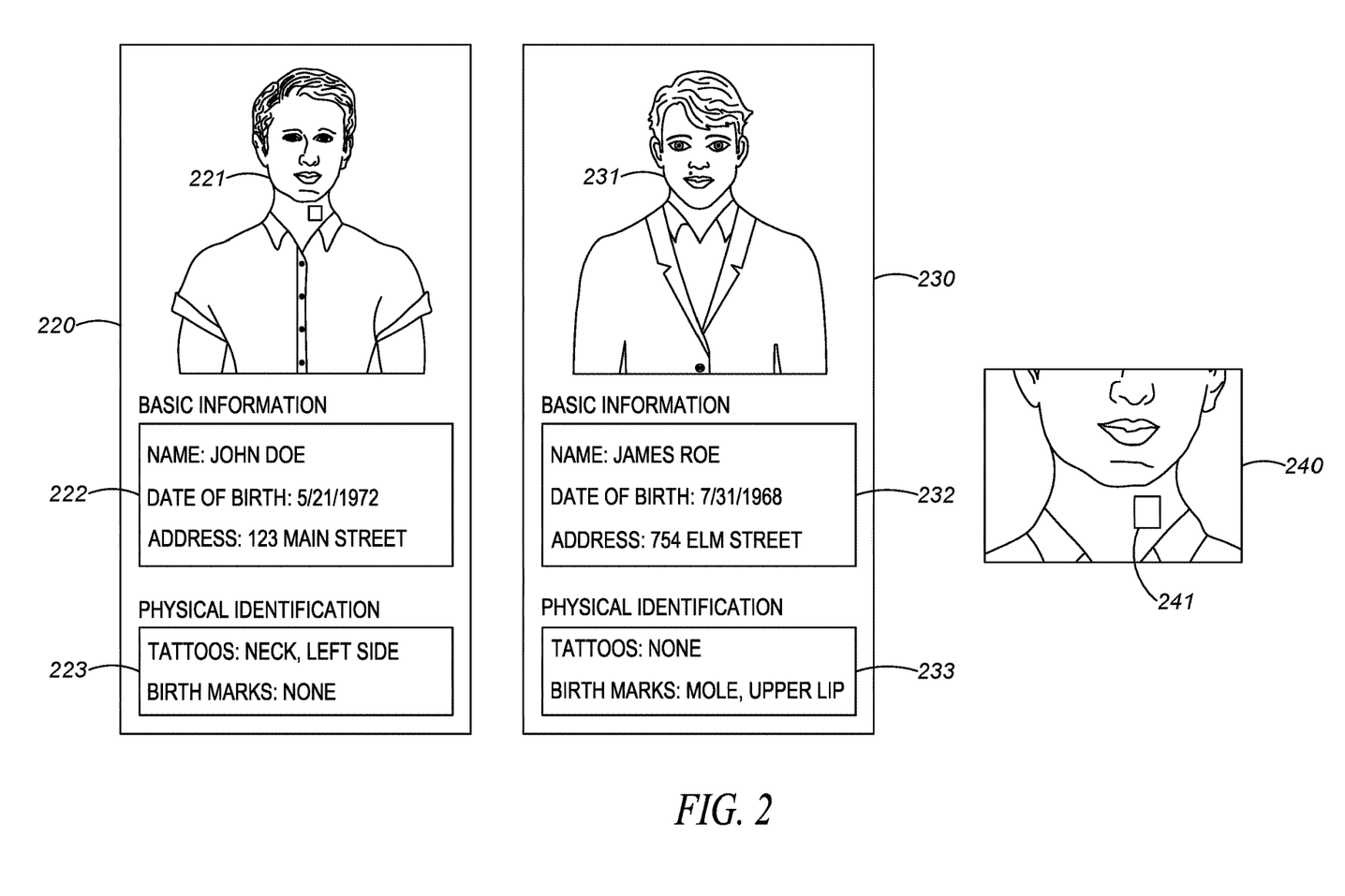
FIG. 2 is an example of a feature that may be used to identify an individual.

FIG. 2 is an example of a feature that may be used to identify an individual. Low resolution image 154 may be the image that is originally sent from the LEO's BWC to the facial recognition system via the network. As shown, the image may include a scene and that scene may include an image of a face. Because the image contains more than just the face and the image may have been sent at a lower resolution than the image was originally captured, details in the image may be difficult see.

The facial recognition system may be coupled to a database that contains records of individual people. The records may include basic information, such as the person's name, address, date of birth, etc. The records may also include a high resolution image of the person. As mentioned above, high resolution is not intended to imply an absolute resolution, but rather is intended to be relative to another image. In this case, a high resolution image may simply be an image whose resolution is higher than the low resolution image 154. Furthermore, the records may include visible physical identification features. For example, tattoos, birthmarks, scars, etc. This information may be stored in a structured format.

For example, record 220 may include a high resolution image of a person 221. The record may also include basic information 222 about the person, such as his name is John Doe, his date of birth is May 21, 1972, and he lives at 123 Main street. Such information, while not useful for visual identification, may be used when it becomes necessary to contact the person associated with the record. The record 220 may also include physical identification information 223. In some cases, that information may be stored in a relatively structured format. For example, there may be categories of physical characteristics (e.g. tattoos, birthmarks, etc.) that are listed, and the record indicates if such a characteristic is present, and if so, where. As shown, record 220 indicates that the person John Doe has a tattoo on the left side of his neck, but has no birthmarks.

In some cases, the facial recognition system may not be able to identify a single record in the database that matches the face contained in the low resolution image 154. Instead, the facial recognition system may identify a subset of people that may possibly be matches. For example, as shown in FIG. 2, a second record 230 may also be a potential match to the low resolution image. In other words, the facial recognition system may have narrowed down the potential matches in the image database to records 220 and 230.

Record 230, just like record 220, may contain a high resolution image of a person 231. The record may also include basic information 232 about the person, such as his name is James Roe, his date of birth is Jul. 31, 1968, and he lives at 754 Elm street. The record 230 may also include physical identification information 233 stored in a structured format. As shown, record 230 indicates that the person James Roe has no tattoos, but does have a birthmark consisting of a mole on his upper lip.

Once the facial recognition system has identified a subset of people that may match the image 154, the system may attempt to identify distinguishing features between those identified individuals. In one possible implementation, the facial recognition system may make use of the store physical identification information, which may also be referred to as meta data to identify distinguishing features. For example, when the data is stored in a structured format, such as shown in FIG. 2, distinguishing features may be identified by comparison of the metadata (e.g. John Doe has a tattoo while James Roe does not). Although this example of identifying a distinguishing feature through the use of metadata is relatively straightforward, it should be understood that an actual implementation may identify distinguishing features through more complex combinations of metadata (e.g. tattoo, of a snake, on the left side of the neck or tattoo on neck and birth mark on lip). What should be understood is that the metadata stored in the record may be utilized to identify distinguishing features.

In another possible implementation, the distinguishing features may be identified by a comparison of the high resolution images of people 221 and 231. For example, algorithms such as a structural similarity index measure or a feature based structural measures may be utilized on the high resolution images to algorithmically identify features that are different between the two high resolution images.

Because the initial image 154 is sent at a low resolution, it may not be possible for the facial recognition system to see the identifying features. For example, if the identifying feature is a tattoo on the neck, the initial image may not depict the portion of the neck with the tattoo in high enough resolution to determine if there is, in fact, a tattoo on the neck of the person whose image was captured by the LEO's BWC.

As such, the facial recognition system may request that the portion of the image containing the identifying feature be sent in higher resolution. For example, in the case where the identifying feature has been determined to be a tattoo on the neck, the system may request the BWC send a second image 240 that includes the portion of the image including the neck at a higher resolution. In some cases, the overall resolution of the image 154 and 240 may be the same, but because the image 240 is zoomed in to a specific portion of the original image, the net effect is that the portion of the image is sent at a higher resolution when compared to the portion of the low resolution image 154 that includes the neck.

Once the facial recognition system receives the higher resolution image of the portion of the image that includes the identifying feature, the system can determine if the identifying feature is present. In the current example, the identifying feature is a tattoo on the neck. Image 240 includes a tattoo 241 on the neck. As such, James Roe cannot be a match for the unidentified person, because James Roe does not have a neck tattoo. Given that the present example initially identified two possible matches, and one has now been eliminated, the only other possible match is to the remaining potential match. It should be noted however that it is possible that the higher resolution image of the portion of the image could show that the identifying feature is not present at all (e.g. no neck tattoo is present). Thus, both potential matches may be eliminated, and the system is not able to successfully identify the person contained in the low resolution image 154.

Figure 3:
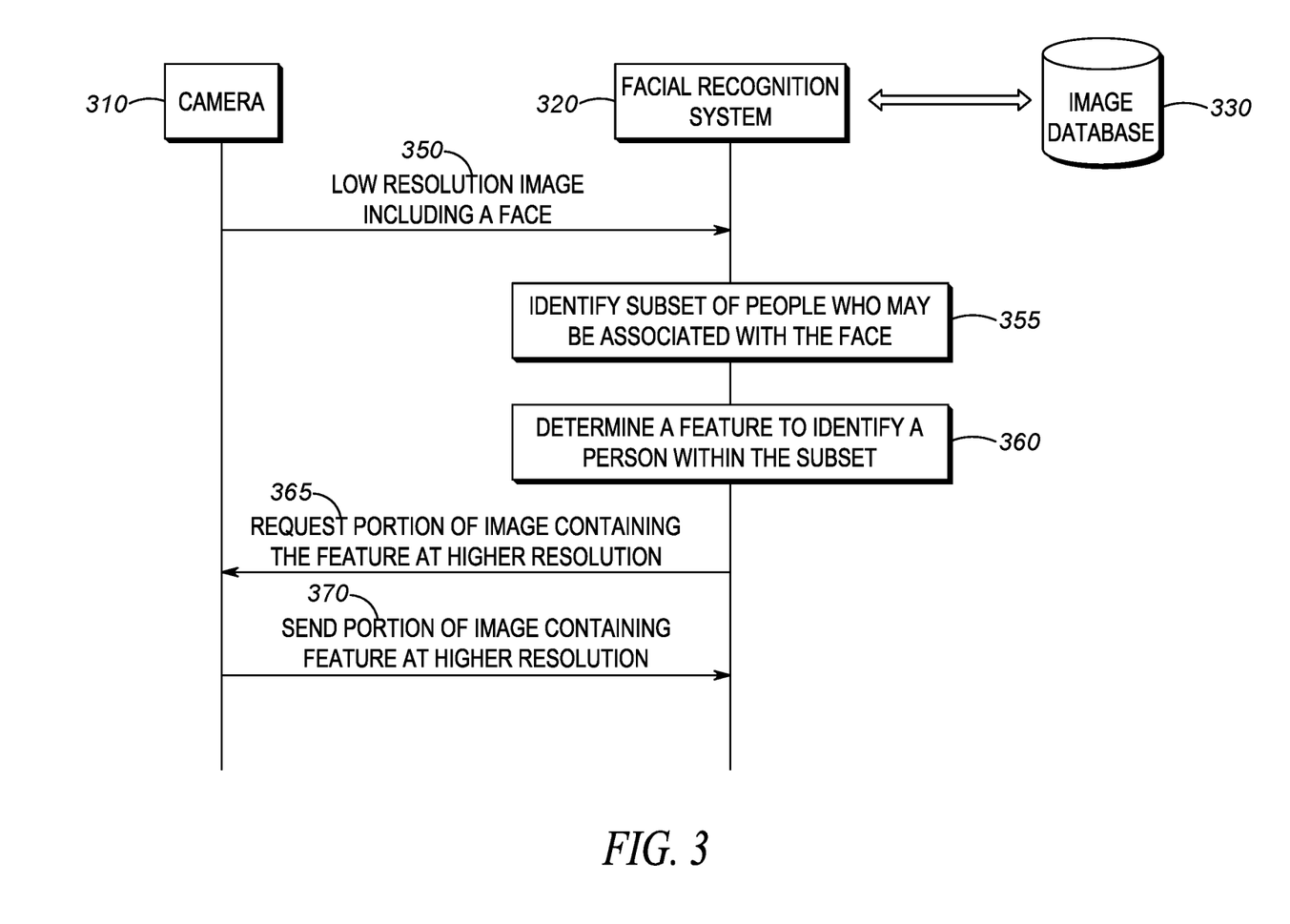
FIG. 3 is an example sequence diagram for saving bandwidth in performing facial recognition.

FIG. 3 is an example sequence diagram for saving bandwidth in performing facial recognition. As shown, FIG. 3 includes a camera 310, a facial recognition system 320, and an image database 330. The camera can be any type of image capture device that is capable of recording images and sending them to the facial recognition system, either independently or through the use of supporting accessories. As described above, one example of a camera may be a BWC coupled to a LMR radio. Other examples may include a BWC with integrated communications capabilities. Other possible examples could include closed circuit television cameras, private security cameras, traffic cameras, etc. It should be understood that the techniques described herein are not limited to any particular type of camera. An example of a suitable image capture device, such as a camera, is described in FIG. 6.

Facial recognition system 320 may receive low resolution images from the camera 310 and attempt to matches to records stored in the image database 330 as described above. An example of a suitable device that may implement the facial recognition system is described with respect to FIG. 5.

In operation, camera 310 may capture an image that includes a face. The image may be captured in high resolution and stored on the camera. The camera may then send a low resolution image including the face 350 to the facial recognition system 320. The facial recognition system may utilize the image database 330 to identify a subset of people who may be associated with the face 355. The process may utilize any currently available or newly developed facial recognition techniques. The techniques described herein are not dependent on any particular facial recognition algorithms.

The facial recognition system 320 may also determine a feature to identify a person within the subset 360. As explained above, when the facial recognition system identifies multiple people who may match the face sent previously, the facial recognition system may identify a distinguishing feature. This process is described in further detail with respect to FIG. 4.

Once a distinguishing feature is determined, the facial recognition system 320 may request the portion of the image containing the feature at higher resolution 365 from the camera 310. In other words, the facial recognition system determines where in the original image the feature of interest is located, and requests that portion of the image at a higher resolution. The camera 310 may then respond by sending the portion of the image containing the feature at a higher resolution 370. It should be noted that the original image is stored at the higher resolution, so zooming into a portion of the image continuing the feature can be performed on that original image.

Figure 4:
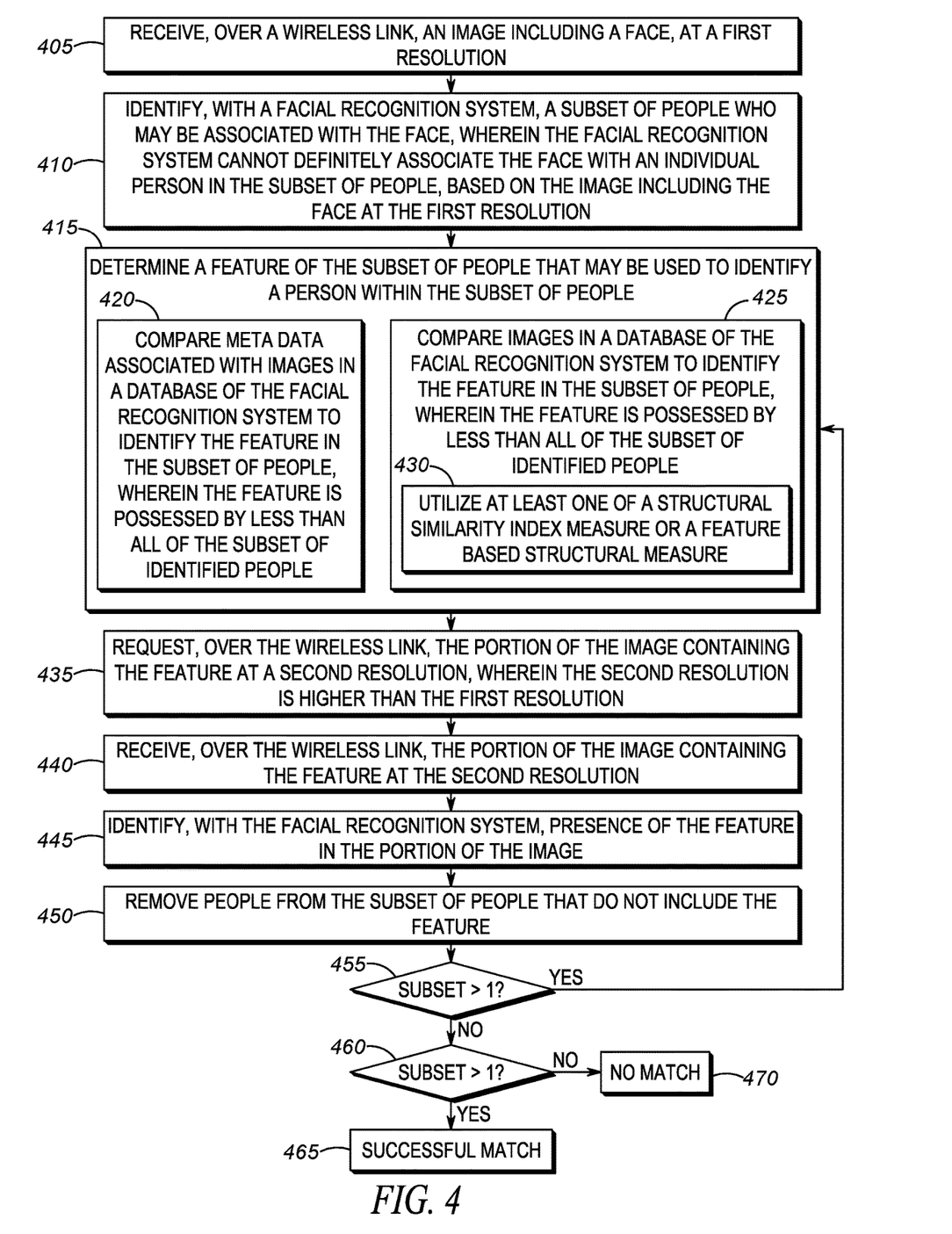
FIG. 4 is an example of a flow chart for implementing techniques for saving bandwidth in performing facial recognition according to the techniques described herein.

FIG. 4 is an example of a flow chart for implementing techniques for saving bandwidth in performing facial recognition according to the techniques described herein. In block 405, an image including a face may be received over a wireless link at a first resolution. Although a wireless link is described, it should be understood that the techniques described herein would be equally applicable when utilizing wired links. As explained above, the image may be received from a camera, for example a BWC.

In block 410 a subset of people who may be associated with the face may be identified by using a facial recognition system. The facial recognition system cannot definitely associate the face with an individual person in the subset of people. The identifying may be based on the image including the face at the first resolution. In other words, the image may be at a first, lower resolution, and include a face. The facial recognition may identify possible matches with faces contained in an image database, but it not able to declare a match with a single individual, but only can declare that the image may match a subset of people. It should be understood that the techniques described herein are not dependent on any particular facial recognition algorithm. Any currently available or later developed facial recognition technique may be used in conjunction with the techniques described herein.

In block 415, a feature of the subset of people that may be used to identify a person within the subset of people may be identified. For example, if the subset of people includes four people, and two of them have visible tattoos, a tattoo is a feature that may be used to identify a person in the subset of people. In other words, a feature that may be used to identify a person is a feature that at least one person in the subset of people does not possess. In one example implementation, the feature may be selected such that approximately half the people in the subset may include the feature. As mentioned above, if two people of a subset of four have a visible tattoo, then that feature may be selected. The selection of a feature that includes/excludes approximately half of the subset of people helps to ensure convergence on a single person occurs as quickly as possible in the greatest number of cases. In an alternative implementation, the feature may be selected such that only a single member of the subset possesses the feature. Such an implementation may effectively eliminate people from the subset one at a time, but comes at the expense of possibly requiring more iterations until a single individual is identified. The techniques described herein are not dependent on any particular selection of a feature to eliminate a certain percentage of people in the subset.

One way the such a feature may be determined is by examining metadata. In block 420 meta data associated with images in a database of the facial recognition system may be compared to identify the feature in the subset of people, wherein the feature is possessed by less than all of the subset of identified people. As described above, the image database may contain meta data that describes physical characteristics of a person. The facial recognition system may analyze that mete data to determine a feature that can be used to identify a person. In the case where the meta data is stored in a somewhat structured format, it may be a simple determination of presence/absence of a feature (e.g. tattoos: yes/no).

Another way that the identifying feature may be determined is through analysis of the images contained in the image database. In block 425 images in a database of the facial recognition system may be compared to identify the feature in the subset of people, wherein the feature is possessed by less than all of the subset of identified people. There are many available techniques to compare two images and detect differences between them. For example, two images may be compared to determine that one image contains a person with facial hair, while another image includes a person without facial hair. In block 430, the comparison may utilize at least one of a structural similarity index measure or a feature based structural measure. Structural similarity index measures and feature based structural measures are known techniques that may be utilized to detect differences in images. These techniques, as well as other currently available and later developed techniques, may be used to identify distinguishing features. The techniques described herein are not dependent on any particular mechanism for determining identifying features.

In block 435, the portion of the image containing the feature may be requested over the wireless link. The portion of the image may be requested at a second resolution, wherein the second resolution is higher than the first resolution. As explained above, the feature may not have been visible in the image received in block 405 because the image may have been received initially at a lower image. The portion of the image including the feature may be requested at a higher resolution, but this does not necessarily mean more bandwidth is used. In some cases, substantially the same amount of bandwidth is used as when sending the initial image, but that bandwidth is used to focus on a smaller portion of the overall image, effectively sending the portion of the image at a higher resolution. In other cases, the portion of the image may be sent at an actual higher resolution, resulting in consumption of additional bandwidth when compared to the initial low resolution image.

In block 440, the portion of the image containing the feature may be received over the wireless link at the second resolution. The image source (e.g. BWC) may simply zoom in on the portion of the original image that contains the feature and send that portion to the facial recognition system. In block 445 the facial recognition system may identify the presence of the feature in the portion of the image. For example, if the identified feature was a neck tattoo, the facial recognition system may determine if the portion of the image received at the second resolution includes a neck tattoo.

In block 450 people from the subset of people that do not include the feature. For example, if the identifying feature has been determined to be a neck tattoo, those individuals in the subset of people who do not have a neck tattoo may be removed from the subset of people.

In block 455 it may be determined if the number of people in the subset of people is greater than one. If so, this means that a match with an individual has not yet been achieved. The process then returns to block 415, wherein a new feature is identified and the process repeats with the newly identified feature.

If the number of people in the subset is not greater than one, the process moves to block 460 where it may be determined if the number of people in the subset equals one. If there is only a single person in the subset of people, then this means the face contained in the original image has now been matched with a record in the image database. The process moves to block 465 to indicate a successful match. If there is not one person left in the subset, this means the subset includes zero people and the process moves to block 470 because there was no match detected.

Figure 5:
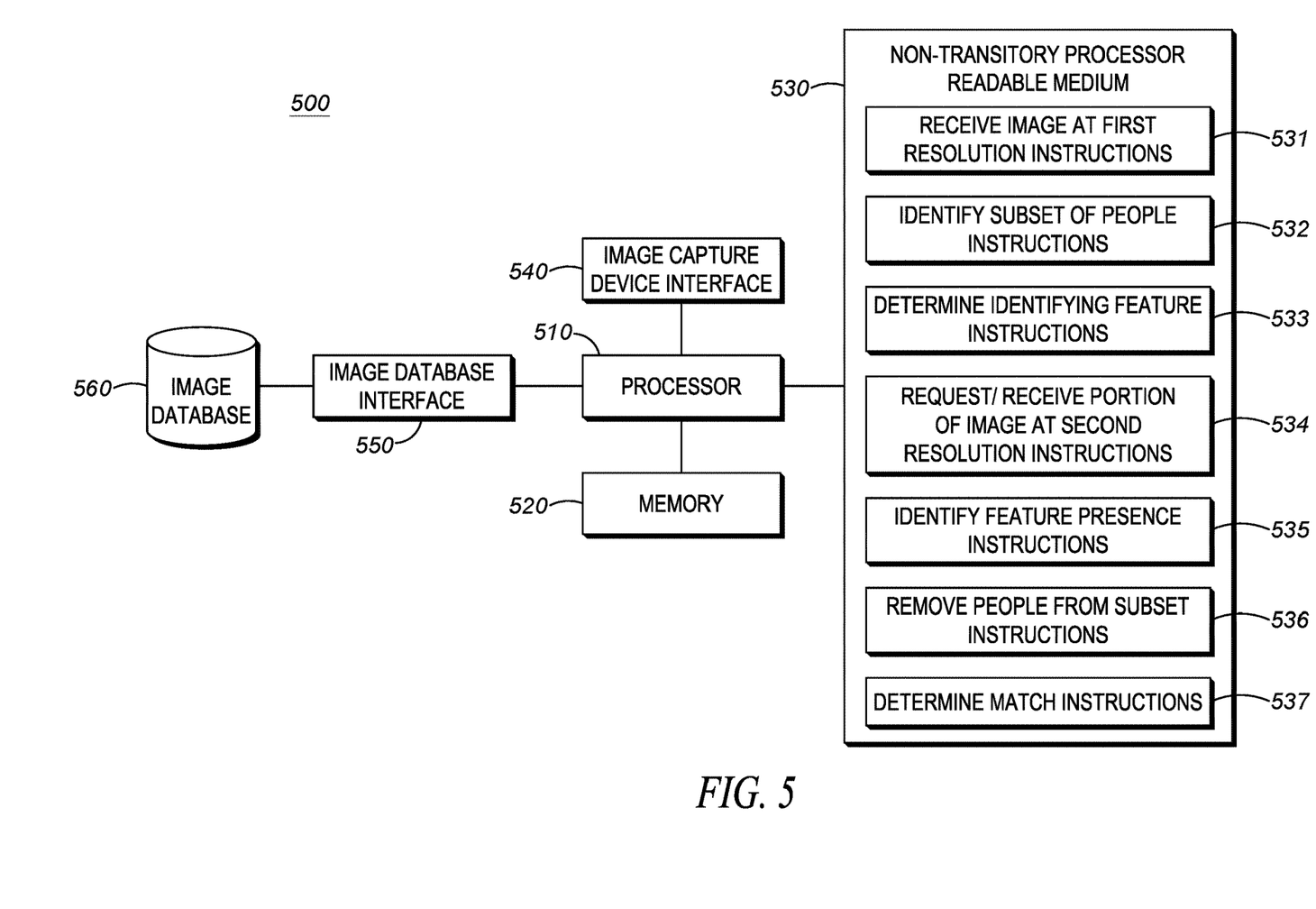
FIG. 5 is an example of a device that may implement the saving bandwidth in performing facial recognition techniques described herein.

FIG. 5 is an example of a device that may implement the saving bandwidth in performing facial recognition techniques described herein. It should be understood that FIG. 5 represents one example implementation of a device that utilizes the techniques described herein. Although only a single processor is shown, it would be readily understood that a person of skill in the art would recognize that distributed implementations are also possible. For example, the various pieces of functionality described above (e.g. facial recognition, feature identification, image database, etc.) could be implemented on multiple devices that are communicatively coupled. For example, a facial recognition system may be a standalone commercial facial recognition system that is coupled to a device that implements the techniques described herein. Likewise, the image database may be a commercially available database that is coupled to the facial recognition system as well as a system that implements the bandwidth reduction techniques described herein. FIG. 5 is not intended to imply that all the functionality described above must implemented on a single processor or within the confines of a single device.

Device 500 may include processor 510, memory 520, non-transitory processor readable medium 530, image capture device interface 540, image database interface 550, and image database 560.

Processor 510 may be coupled to memory 520. Memory 520 may store a set of instructions that when executed by processor 510 cause processor 510 to implement the techniques described herein. Processor 510 may cause memory 520 to load a set of processor executable instructions from non-transitory processor readable medium 530. Non-transitory processor readable medium 530 may contain a set of instructions thereon that when executed by processor 510 cause the processor to implement the various techniques described herein.

For example, medium 530 may include receive image at first resolution instructions 531. These instructions may cause the processor to receive the image that includes a face from the image capture device, such as a BWC, via image capture device interface 540. The image capture device interface 540 may generally be any interface that allows the device 500 and the image capture device to communicate. For example, in some cases, the image capture device may be directly coupled to the device 500 via a wired cable. In other implementations, the two devices may be coupled via a wired or wireless network. What should be understood is that the image capture device interface allows the device 500 to receive images and to request portions of images. Receive image at first resolution instructions 531 generally correspond with block 405.

The medium 530 may also include identify subset of people instructions 532. This functionality may utilize any known or newly developed facial recognition technique. The bandwidth saving techniques described herein are not dependent on any particular form of facial recognition algorithm. In some cases, facial recognition may be performed by an external third party system. What should be understood is that instructions 532 may be used to identify a subset of people who may match a face contained in an image. Image database 560 may store records that are associated with individuals. These records may include metadata about the individuals as well as high resolution images of those individuals. Image database 560 may be integrated with device 500, may be part of an external facial recognition system, or may itself be a standalone commercially available database of records. Identify subset of people instructions 532 generally correspond with block 410.

The medium 530 may also include determine identifying feature instructions 533. The determining identifying feature instructions may cause the processor to examine records associated with the subset of people to identify features that may be utilized to identify individuals. In some cases, the features may be determined via comparison of metadata stored in the records stored in image database 560. In other cases, the comparison may be done using various techniques on the high resolution images. Determine identifying feature instructions 533 generally correspond with blocks 415-430.

The medium 530 may also include request/receive portion of image at second resolution instructions 534. The request/receive portion of image at second resolution instructions may cause the processor to utilize the image capture device interface 540 to request portions of the image that include the identifying features. Request/receive portion of image at second resolution instructions 534 generally correspond with blocks 435-440.

The medium 530 may also include identify feature presence instructions 535 which may cause the processor to determine if the identifying feature is included in the portion of the image. Identify feature presence instructions 535 generally correspond with block 445. The medium 530 may also include remove people from subset instructions 536 which may cause the processor to remove people from the subset who do not possess the identifying feature. Remove people from subset instructions 536 generally correspond with block 450.

The medium 530 may also include determine match instructions 537 which may cause the processor to determine how many people remain in the subset. If more than one person remains, the process may repeat iteratively. If only a single person remains, the match is successful. If no one remains, then no match was found. Determine match instructions 537 generally correspond with blocks 455-470.

Figure 6:
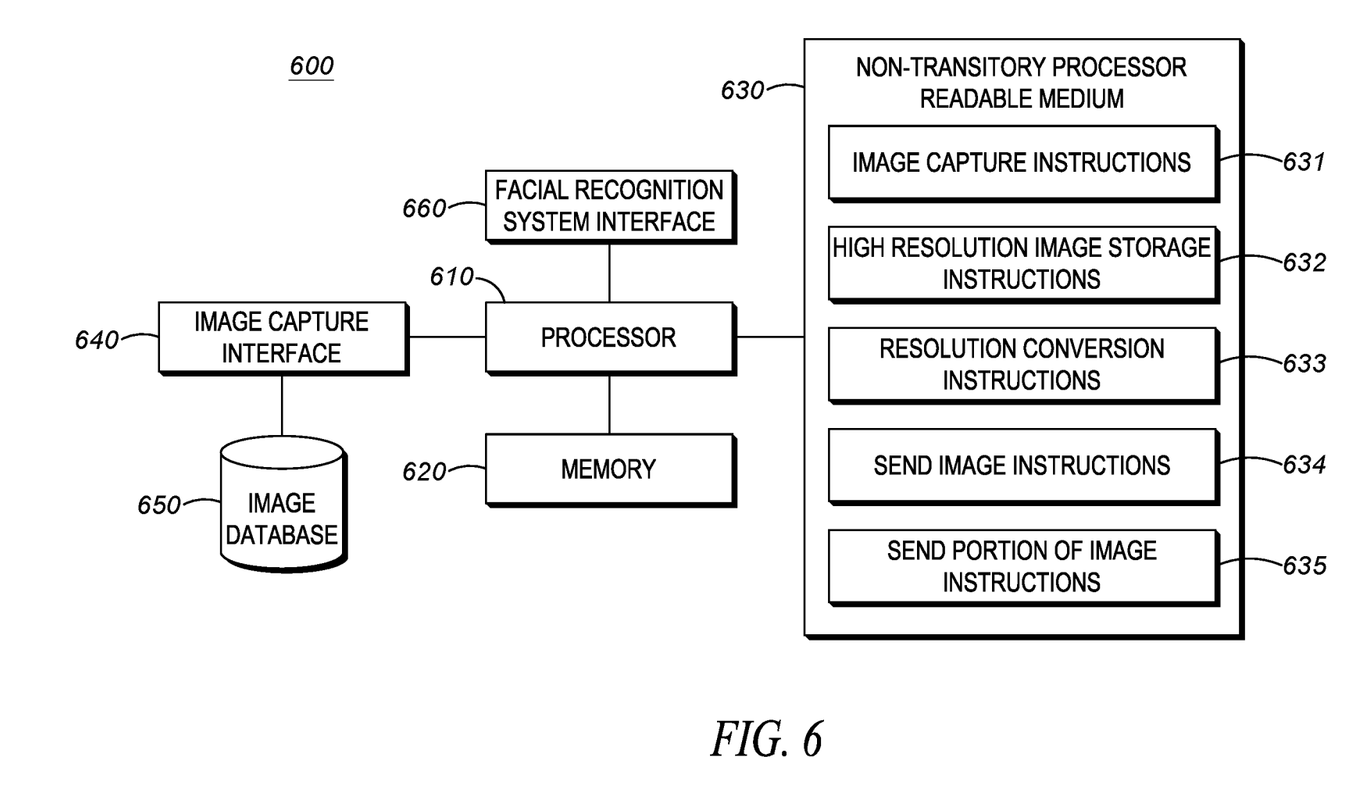
FIG. 6 is an example of an image capturing device that may implement the saving bandwidth in performing facial recognition techniques described herein.

FIG. 6 is an example of an image capturing device that may implement the saving bandwidth in performing facial recognition techniques described herein. It should be understood that FIG. 6 represents one example implementation of a device that utilizes the techniques described herein. Although only a single processor is shown, it would be readily understood that a person of skill in the art would recognize that distributed implementations are also possible. For example, the various pieces of functionality described above (e.g. image capture and storage, wireless/wired image transmission, sending portion of image, etc.) could be implemented on multiple devices that are communicatively coupled. For example, a BWC may include integrated wireless communications capabilities or may be coupled to a LMR device which provides communications capabilities. FIG. 6 is not intended to imply that all the functionality described above must implemented on a single processor or within the confines of a single device.

Device 600 may include processor 610, memory 620, non-transitory processor readable medium 630, image capture interface 640, image storage 650, and facial recognition system interface 660.

Processor 610 may be coupled to memory 620. Memory 620 may store a set of instructions that when executed by processor 610 cause processor 610 to implement the techniques described herein. Processor 610 may cause memory 620 to load a set of processor executable instructions from non-transitory processor readable medium 630. Non-transitory processor readable medium 630 may contain a set of instructions thereon that when executed by processor 610 cause the processor to implement the various techniques described herein.

For example, medium 630 may include image capture instructions 631. The image capture instructions may cause the processor 610 to utilize the image capture interface 640 to capture an image of an environment that may include a face. For example, the image capture device may be a BWC which is coupled to an LMR device to provide wireless communications. Thus, the image capture interface may be the interface between the LMR device and the BWC. In other implementations, the image capture device (e.g. BWC) may include integrated communications capabilities. In such a case, the image capture interface may be the interface to the integrated image capture hardware (e.g. camera).

The medium 630 may include high resolution image storage instructions 632. As mentioned above, the image of a scene may be captured in a higher resolution than will actually be sent to the facial recognition system because of possible bandwidth constraints. The original high resolution image may be stored locally. For example, on image storage 650. Image storage 650 may include non-volatile storage, such as flash memory, a hard disk, or any other form of non-volatile memory. Image storage may also include volatile memory such as Random Access Memory (RAM). Storing the high resolution image allows for the device 600 to later send different portions of the image to the facial recognition system at different resolutions.

The medium 630 may also include resolution conversion instructions 633. As mentioned above, the image may be captured at a high resolution, but sent to the facial recognition system at a lower resolution. The resolution conversion instructions may facilitate this conversion.

The medium 630 may also include send image instructions 634 that may cause an image to be sent to the facial recognition system. For example, the send image instructions may cause the processor to utilize the facial recognition system interface 660 to send the image to the facial recognition system. The facial recognition interface may include any mechanism that may allow an image to be transferred. For example, the connection between device 600 and the facial recognition system may be a hardwired connection. The connection may be a direct wireless connection (e.g. Bluetooth). The connection may be a connection through a wireless network (e.g. WiFi, LTE). It should be understood that the techniques described herein are not limited to any particular form of communication between the device 600 and the facial recognition system.

The medium may also include send portion of image instructions 635. As described above, the facial recognition system may request, through facial recognition system interface 660, that a portion of the image be sent. The send portion of image instructions may cause the original high resolution image to be retrieved from image storage 650. The send portion of image instructions may then zoom in to the requested portion of the image. In some cases, the resolution conversion instructions 633 may be used to convert the resolution of the portion of the image to a desired resolution (e.g. for limited bandwidth purposes). The send portion of image instructions may then be used to send the portion of the image to the facial recognition system via facial recognition system interface 660.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. The phrase "at least one of A or B" as used herein is defined as any combination of at least one A only, at least one B only, or at least one of both A and B.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a compact disc read only memory (CD-ROM), an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (IC) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   receiving, over a wireless link, an image including a face, at a first resolution;
   identifying, with a facial recognition system, a subset of people whose face matches the face at a confidence level lower than a confidence level threshold that indicates a match, based on the image including the face at the first resolution;
   determining a feature of a person of the subset of people that is used to distinguish the person within the subset of people;
   requesting, over the wireless link, a portion of an image at a second resolution containing the feature, wherein the second resolution is higher than the first resolution;
   receiving, over the wireless link, the portion of the image at the second resolution containing the feature at the second resolution; and
   identifying, with the facial recognition system, presence of the feature in the portion of the image.

2. The method of claim 1 further comprising:
   removing people from the subset of people that do not include the feature; and
   repeating the steps of determining the feature, requesting the portion of the image, receiving the portion of the image containing the feature, identifying the presence, and removing people from the subset until the subset contains, at most, one person.

3. The method of claim 1 wherein the image of the face at the first resolution and the portion of the image containing the feature at the second higher resolution consume the same amount of bandwidth on the wireless link.

4. The method of claim 1 wherein identifying a feature in the subset of people further comprises:
   comparing meta data associated with images in a database of the facial recognition system to identify the feature in the subset of people, wherein the feature is possessed by less than all of the subset of people.

5. The method of claim 1 wherein identifying a feature in the subset of people further comprises:
   comparing images in a database of the facial recognition system to identify the feature in the subset of people, wherein the feature is possessed by less than all of the subset of people.

6. The method of claim 5 wherein comparing images further comprises:
   utilizing at least one of a structural similarity index measure or a feature based structural measure.

7. A system comprising:
   a processor; and
   a memory coupled to the processor, the memory containing a set of instructions that when executed by the processor cause the processor to:
   receive, over a wireless link, an image including a face, at a first resolution;
   identify a subset of people whose face matches the face at a confidence level lower than a confidence level threshold that indicates a match based on the image including the face at the first resolution;
   determine a feature of a person of the subset of people that is used to distinguish the person within the subset of people, the feature included in a portion of the image of the face;
   request, over the wireless link, a portion of an image at a second resolution containing the feature, wherein the second resolution is higher than the first resolution;
   receive, over the wireless link, the portion of the image at the second resolution containing the feature at the second resolution; and
   identify presence of the feature in the portion of the image.

8. The system of claim 7 further comprising instructions to:
   remove people from the subset of people that do not include the feature; and
   repeat the instructions to determine the feature, the request the portion of the image, the receive the portion of the image containing the feature, the identify the presence, and the remove people from the subset until the subset contains, at most, one person.

9. The system of claim 7 wherein the image of the face at the first resolution and the portion of the image containing the feature at the second higher resolution consume the same amount of bandwidth on the wireless link.

10. The system of claim 7 wherein the instructions to identify a feature in the subset of people further comprises instructions to:
    compare meta data associated with images in a database to identify the feature in the subset of people, wherein the feature is possessed by less than all of the subset of identified people.

11. The system of claim 7 wherein the instructions to identify a feature in the subset of people further comprises instructions to:
    compare images in a database to identify the feature in the subset of people, wherein the feature is possessed by less than all of the subset of identified people.

12. The system of claim 11 wherein the comparing images instructions further comprises instructions to:
    utilize at least one of a structural similarity index measure or a feature based structural measure.

13. A non-transitory processor readable medium containing a set of instructions thereon that when executed by a processor cause the processor to:
    receive, over a wireless link, an image including a face, at a first resolution;

identify a subset of people whose face matches the face at a confidence level lower than a confidence level threshold that indicates a match based on the image including the face at the first resolution;

determine a feature of a person of the subset of people that is used to distinguish the person within the subset of people, the feature included in a portion of the image including the face;

request, over the wireless link, a portion of an image at a second resolution containing the feature, wherein the second resolution is higher than the first resolution;

receive, over the wireless link, the portion of the image at the second resolution containing the feature at the second resolution; and identify presence of the feature in the portion of the image.

14. The non-transitory processor readable medium of claim 13 further comprising instructions to:

remove people from the subset of people that do not include the feature; and repeat the instructions to determine the feature, the request the portion of the image, the receive the portion of the image containing the feature, the identify the presence, and the remove people from the subset until the subset contains, at most, one person.

15. The non-transitory processor readable medium of claim 13 wherein the instructions to identify a feature in the subset of people further comprises instructions to:

compare meta data associated with images in a database to identify the feature in the subset of people, wherein the feature is possessed by less than all of the subset of identified people.

16. The non-transitory processor readable medium of claim 13 wherein the instructions to identify a feature in the subset of people further comprises instructions to:

compare images in a database to identify the feature in the subset of people, wherein the feature is possessed by less than all of the subset of identified people.

17. The non-transitory processor readable medium of claim 16 wherein the comparing images instructions further comprises instructions to:

utilize at least one of a structural similarity index measure or a feature based structural measure.

* * * * *